United States Patent

[11] 3,580,995

[72] Inventor Richard J. Klensch
Trenton, N.J.
[21] Appl. No. 725,041
[22] Filed Apr. 29, 1968
[45] Patented May 25, 1971
[73] Assignee RCA Corporation

[54] CONSTANT SIZED HALFTONE DOT IMAGE GENERATOR
8 Claims, 2 Drawing Figs.

[52] U.S. Cl. .......... 178/6.7, 178/6.6B
[51] Int. Cl. .......... H04m 5/84
[50] Field of Search .......... 178/6.7, 6.7 (A), 6.6 (B), 7.7; 179/100.3 (A)

[56] References Cited

UNITED STATES PATENTS

| | | | |
|---|---|---|---|
| 2,115,894 | 5/1938 | Watson | 178/6.7 |
| 2,136,340 | 11/1938 | Hardy | 178/6.7UX |
| 2,222,991 | 11/1940 | Sorkin | 178/6.7 |
| 2,294,643 | 9/1942 | Wurzburg | 178/6.7 |
| 2,892,887 | 6/1959 | Hell | 178/6.6 |
| 3,197,558 | 7/1965 | Ernst | 178/6.6 |
| 3,246,079 | 4/1966 | Teucher | 178/6.6 |

*Primary Examiner*—Stanley M. Urynowicz, Jr.
*Assistant Examiner*—Raymond F. Cardillo, Jr.
*Attorney*—H. Christoffersen

ABSTRACT: A halftone image generator that simulates the continuous tones in an original pattern by producing a plurality of visually subliminal halftone dots of substantially the same size, with the coordinate spacings between the halftone dots being made dependent upon the density of the tones in the original pattern.

INVENTOR
RICHARD J. KLENSCH
BY John T. O'Halloran
ATTORNEY

CONSTANT SIZED HALFTONE DOT IMAGE GENERATOR

CROSS-REFERENCE TO RELATED APPLICATIONS

Reference is made to a copending patent application entitled "Halftone Image Generation system," Ser. No. 692,944, filed Dec. 22, 1967 by Edward W. Herold and Kenneth H. Fischbeck and assigned to the same assignee as the present invention.

BACKGROUND OF THE INVENTION

The printing process commonly used in the graphic arts industry, i.e., newspaper publishing, book publishing, etc., deposits a large amount of ink on paper whenever it is desired to print all or a portion of a pattern and deposits no ink when the absence of a pattern is desired. This all-or-nothing process presents no problems when patterns such as alphabetic symbols and other marks are to be printed. However, when patterns such as photographs are to be printed, the problem of duplicating the continuous tones (i.e., light graduations) in the original pattern arises. This problem was solved by transforming the continuous tones in the original pattern into a halftone image that is composed of a large number of ink dots of various sizes, with the sizes of the dots being proportional to the tones in the original pattern. In such a "screening" process, largest dots and the white paper between the dots are made small compared to the visual acuity of the human eye, i.e., the dots and the spacings between the dots are subliminal to the eye, so that the dots and the spacings fuse visually in the screened image and trick the eye into believing it is seeing continuous tones.

In the previously referenced copending patent application, there is disclosed a halftone generation system wherein halftone dots of substantially the same size are utilized to simulate the original continuous tones. The use of halftone dots of the same size avoids the nonlinear effects that occur in the transfer of ink from halftone dots of different sizes to the printing paper. In the previously referenced system, the halftone dots are electronically generated and the number of halftone dots generated per unit length of the printing surface varies, depending upon the tones in the original pattern. Such a single coordinate variation tends to create wavelike line patterns in the other coordinate direction that may be disturbing to the human eye. To prevent the creation of such wavelike line patterns, a random noise generator was added to the system to randomly break up the wavelike line patterns. However, it is desirable to be able to prevent the creation of wavelike patterns without the necessity of adding a random noise generator to the system.

SUMMARY OF THE INVENTION

A halftone image generator produces on a surface a plurality of visually subliminal halftone dots of substantially the same size, with the spacings between the dots being varied in two coordinate directions so as to simulate the continuous tones in the original pattern without introducing undesirable wavelike patterns into the halftone image.

DETAILED DESCRIPTION

Figures 1, 2:
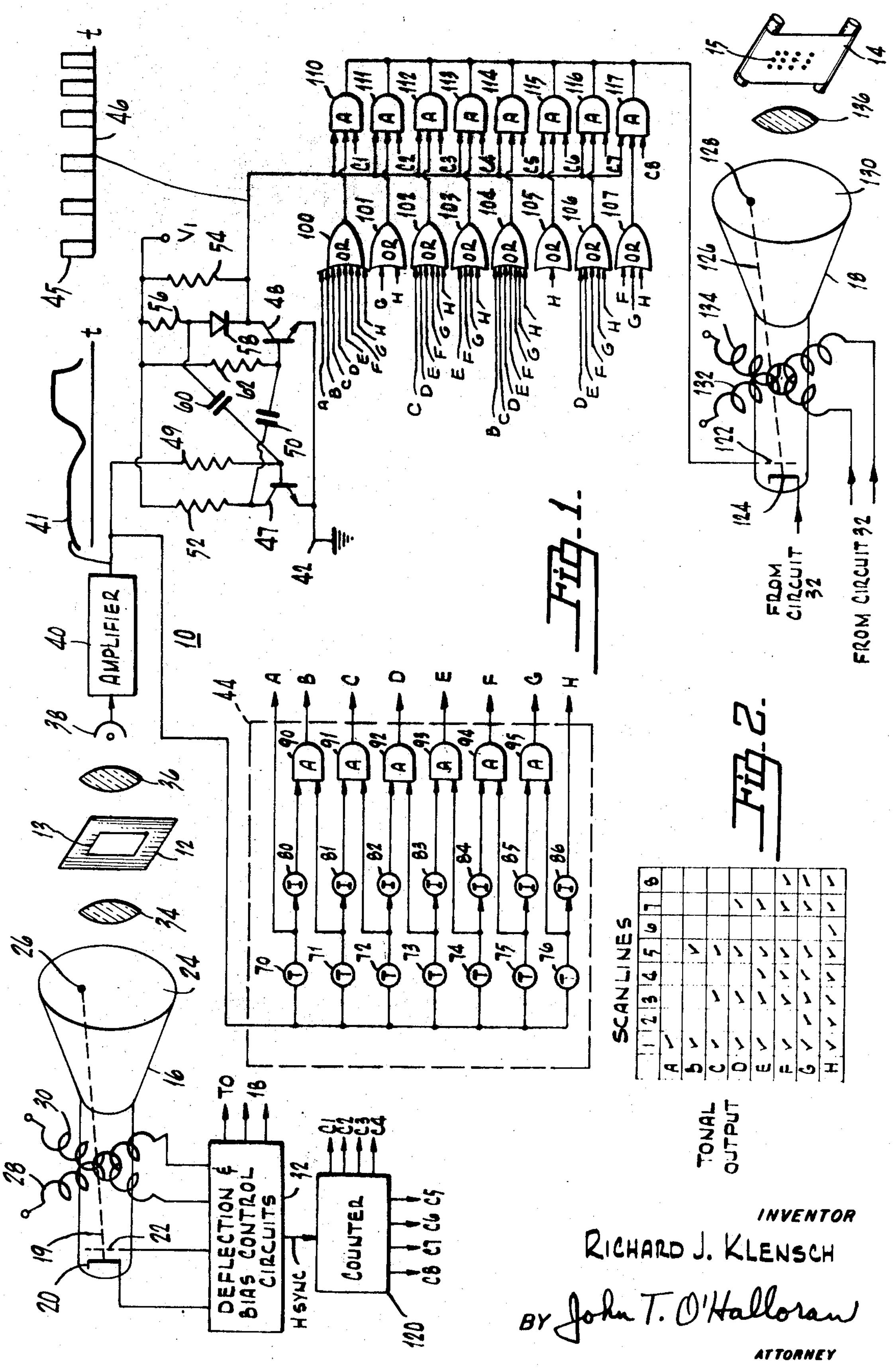
FIG. 1 is a schematic block diagram of a halftone image generator embodying the invention.
FIG. 2 is a table representing the number of scanlines required in the generator of FIG. 1 to simulate various continuous tones.

Referring now to FIG. 1, a halftone image generator 10 converts the continuous tones of a pattern 13 on a transparency 12 (upper left) into a halftone image 15 thereof on photographic film 14 (lower right). The halftone image comprises a plurality of visually subliminal halftone dots 15 whose number per unit area is a function of the density of the corresponding tone on the transparency 12 that is being reproduced. This is accomplished by electronically screening the transparency 12. Accordingly, the transparency 12 is scanned by a scanner 16 to transform the continuous tones on the transparency 12 into analog electronic signals. The analog electronic signals are processed to form digital electronic pulses that create light spots on the face of an imaging device 18, which light spots produce radiation pulses that are focused onto the photographic film 14. The exposed and then developed photographic film 14 exhibits a predetermined reflectance and the halftone dots exhibit a different reflectance.

The scanner 16 may comprise a cathode ray tube that is operated as a flying spot scanner. The scanner 16 includes an electron beam 19 that emanates from a cathode 20 under the control of a control grid 22. The electron beam 19 is projected onto the face 24 of the scanner 16 so as to form in conjunction with the phosphor thereon a scanning or flying spot 26. The scanning spot 26 is deflected in a predetermined scanning pattern by horizontal 28 and vertical 30 deflection coils. The scanning spot 26, may for example, be deflected in an orthogonal raster scanning pattern that begins at the upper left of the tube 16 and scans to the right across the face of the tube in a relatively fast scan. The scanning spot 26 is then retraced and deflected downwardly for the next horizontal scan. The scanning pattern continues until the bottom of the tube 16 is reached, and then the spot 26 is retraced to the top of the tube 16 and the scanning continues. The synchronized scan control signals for the scanner 16 are derived from a deflection and biasing control circuit 32. The deflection control circuit 32 also makes separately available the horizontal scan signals and the vertical scan signals.

The light emanating from the scanning spot 26 is imaged by a lens system, shown as a single convex lens 34 in FIG. 1, onto the transparency 12 and the light penetrating through the transparency 12 is focused by another lens system 36 onto a photosensitive detector or diode 38. The various intensities of light impinging upon the photodiode 38 are dependent upon the density of the tones in the transparency 12. The light is transduced by the photodiode 38 into analog electronic signals that are amplified in an amplifier 40. The amplified analog electronic signals which may be similar to the signals 41 in FIG. 1 are applied to both a variable frequency multivibrator 42 and a tone digitizer circuit 44.

The variable frequency multivibrator 42 effectively determines the density or number of halftone dots in one coordinate direction, the X direction, that is needed to simulate a continuous tone in the transparency 12. The digitizer circuit 44 effectively determines the density of the halftone dots required in the other coordinate direction, the Y direction. Thus, the density of the halftone dots is varied in both coordinate directions in accordance with the tones in the transparency 12.

The variable frequency multivibrator 42 produces output pulses 45 such as shown by the waveform 46 in FIG. 1. It is to be noted that the pulses 45 are substantially uniform in duration and height, but vary in number per unit of time. The number of pulses 45 in the waveform 46 is a function of the tone in the transparency 12. As the tone becomes lighter, more light penetrates through the transparency 12, and more pulses 45 are generated in the multivibrator 42.

The multivibrator 42 includes first 47 and second 48 cross-coupled transistors. The first or input transistor 47 includes an input base electrode that is coupled through a resistor 49 to the output of the amplifier 40. The transistor 47 also includes the emitter electrode that is coupled to a reference point or ground in the generator 10, and an output collector electrode that is cross-coupled to the input base electrode of the second transistor 48 through a capacitor 50. The collector of the transistor 47 is also coupled through a load resistor 52 to a positive power supply $V_1$. The second or output transistor 48 of the multivibrator also includes a grounded emitter electrode as well as an output collector electrode that is coupled through a load resistor 54 to the power $V_1$. The load resistor 54 is shunted by a load dividing resistor 56 and diode 58. The junction of the resistor 56 and the anode of the diode 58 is coupled through a cross-coupling capacitor 60 to the input base electrode of the input transistor 47. The base electrode of the output transistor 48 is coupled through a resistor 62 to the power supply $V_1$.

The R–C time constant of the resistor 62 and the capacitor 50 as well as the voltage of the supply $V_1$ effectively determine the duration of the nonconduction period of the output transistor 48. When the output transistor 48 is not conducting, the collector electrode thereof is at the level of the power supply voltage $V_1$ and hence is producing an output pulse 45. When the transistor 48 is conducting, it conducts at saturation and hence the collector thereof is substantially at ground potential and not producing an output pulse. Since the time constant of the resistor 62 and capacitor 50 and the power supply voltage $V_1$ are all fixed, the durations of the positive going output pulses 45 are constant.

Although the time constant of the resistor 49 and the capacitor 60 is fixed, the input signal level to this R–C combination varies with the tones in the transparency 12. Therefore, the period of nonconduction of the input transistor 47 varies with the level of the input signal. Hence, the period or spacing between the output pulses 45 varies as a function of the input signal level. The variable frequency multivibrator 42 therefore varies the number or density of the halftone dots in one coordinate direction, which is the X coordinate direction.

The spacing or density of the halftone dots in the Y coordinate direction is determined by the digitizer circuit 44 which accomplishes this objective by measuring the amplitude of the electronic image signals 41 and decides which of the scanlines in the imaging device 18 are to produce halftone dots. Thus, a plurality of halftone dots may occur in one scanline of the imaging device 18, whereas no halftone dots occur in another scanline. A different plurality may occur in the next scanline and so on. The frequency of occurrence or density of the halftone dots in two dimensional areas of the surface of the film 14 substantially simulates the continuous tone being scanned by the scanner 16.

The electronic image signal 41 is applied to a plurality of threshold detectors 70—76 of the digitizer circuit 44. Each successive one of the threshold detectors fires on a correspondingly greater amplitude image signal 41. The first threshold detector 70 may comprise a signal single diode coupled to the base of an inverting transistor. The second detector 71 comprises two serially connected diodes coupled to an inverting transistor and so on up to seven serially connected diodes coupled to an inverting transistor for the detector 76. The inverted output of each of the detector 70 through 76 is coupled through a corresponding inverter 80 through 86. The output of each of the inverters 80 through 86 is coupled to one input terminal of corresponding AND gates 90 through 95. The other input to each of the AND gates comprises the inverted output of the next successive threshold detector.

The varying amplitude output signal from the amplifier 40 is quantized or digitized by the circuit 44 to provide one out of eight output levels, A through H. The output depends upon which of the detectors fire. If the detector 76 fires, all of the other detectors also fire and block each preceeding AND gate from conducting, since an AND gate only conducts on the simultaneous presence of two high level input signals. The output H, therefore appears. Thus, the circuit 44 is effectively a tone measuring circuit.

The outputs A through H of the circuit 44 are grouped together selectively and applied to a plurality of OR gates 100 through 107. The groupings are shown in detail in FIG. 1. The output of each OR gate provides one input to a corresponding one of a plurality of scanline select AND gates 110 through 117. The second input to each of the AND gates 110 through 117 is the pulse derived from the variable frequency multivibrator 42. The remaining input to each of the AND gates 110 through 117 are scanline counts to one (C1) through eight (C8), respectively. The scanline counts are derived from a counter 120 to which are applied the horizontal synchronizing pulses (H sync) derived from the deflection control circuits 32. The counter 120 may, for example, comprise a three stage binary counter that counts in cycles of eight. Since a horizontal synchronizing pulse defines a horizontal scanline, the counter 120 counts these scanlines in cycles of eight and is consequently reset once each every cycle of eight.

The outputs of each of the scanline select gates 110—117 are coupled to the control grid 122 of the display or imaging device 18. The display device 18 may comprise a cathode ray tube having a cathode 124 from which an electron beam 126 emanates to form a light spot 128 in the phosphor on the face 130 of the tube 18. The electron beam 126 is deflected in synchronism with the electron beam 19 in the scanner 16 by horizontal and vertical deflection coils 132 and 134, respectively that are driven by the deflection control circuits 32. The radiation pulses formed by the light spots 128 on the display device 18 are focused by a lens 136 onto photographic film 14. The photographic film 14 makes a halftone image recording 15 of the pattern displayed on the face of the tube 18.

OPERATION

To electronically screen the pattern 13 on the transparency 12 to produce a halftone image of the pattern 13, the transparency 12 is scanned by the flying light spot scanner 16 to provide a signal that varies in accordance with the continuous tones on the transparency 12. It is assumed that the transparency 12 is a photographic negative of an original scene. A photographic positive may also be utilized but such operation of the system 10 requires an additional electrical inversion.

The transparency 12 is scanned from left to right and from top to bottom by the scanner 16, the deflection of which is controlled by the deflection and bias control circuit 32. The circuit 32 produces a horizontal synchronizing pulse at each scanline that is counted by the counter 120, in cycles of eight pulses apiece. The light from the scanning spot 26 is focused onto the transparency 12 by the lens 34 and the amount of light penetrating through the transparency 12 depends upon the continuous tones therein. The transmitted light is focused by the lens 36 onto the photodiode 38 where the light is transduced into an analog electronic image signal which is amplified in the amplifier 40. The amplified electronic image signal 41 is applied to the variable frequency multivibrator 42.

Initially, the output transistor 48 in the multivibrator 42 is conducting and the output is at substantially ground potential due to the saturation of this transistor 48. The input electronic signal is applied to the base of the input transistor 47 by means of the resistor 49 and capacitor 60. The R–C time constant of this combination and the amplitude of the input signal determines when the input transistor 47 turns on, which in turn effectively cuts off the output transistor 48. The turn off of the output transistor 48 causes the collector thereof to rise from ground potential to the supply voltage $V_1$ and an output pulse 45 is produced by the oscillator 42. The output pulses 45 are substantially uniform in duration. The fixed time constant of the resistor 62 and the capacitor 50 as well as the constant voltage of the power supply $V_1$ causes the capacitor 50 to charge the same amount in the same time interval on each conduction of the input transistor 47. The number of pulses 45 produced by the multivibrator 42 depends upon the amplitude of the input analog signal 41 which in turn is a function of the tones in the transparency 12. When the analog signal 41 exhibits a large amplitude, the capacitor 60 charges up to a predetermined point fast and hence produces a high repetition rate of output pulses 45. The opposite is true when the amplitude of the input signal 41 is low. Thus, the densities of the tones in the transparency 12 determine the number of output pulses 45 per unit of time. Time is equivalent to units of length on the transparency 12. The output pulses 45 are all uniform in amplitude and duration, and hence are convertible into uniform size halftone dots. Therefore, in the X coordinate direction, the spatial frequency of the halftone dots is determined by the continuous tones in the transparency 12.

The density of the tones in the transparency 12 also determines the spatial frequency of the halftone dots in the Y coordinate direction. This is accomplished by selecting the scanlines of the display device 18 in which the variable frequency pulses 45 produced by the multivibrator 42 will appear. The basis of selection is the analog signal input signal 41. If a tone causes a large amplitude signal, then, for example, the threshold detector 74 in the digitizer circuit 44 may conduct. Additionally, the detectors 70 through 73 will also conduct. An output will therefore be produced from the fifth level F of the tone measuring or digitizer circuit 44. However, no output will be produced from other levels because the AND gates 90 through 93 have one high level signal, from the inverters 80 through 83, and one low level signal, from the inverting detectors 70 through 73, applied to the inputs of these gates and hence do not conduct. The AND gate 94 does conduct because two high level signals are applied thereto and this gate 94 produces the F output signifying one of the lighter tones in the transparency 12. Consequently, the OR gates 100, 102, 103, 104, 106, and 107 will be activated by the F output level. The AND gates 110, 112, 113, 114, 116, and 117 are then activated at the scanline counts from the counter 120 of C1, C3, C4, C5, C7, and C8. The output pulses 45 produced by the multivibrator 42 are therefore coupled to the control grid 122 of the imaging device 18 through these gates.

The scanning of the imaging device 18 is done in synchronism with the flying spot scanner 16 so that corresponding positions in these tubes are being scanned simultaneously. However, the scanning beam 126 is normally turned off in the imaging device 18 and is only turned on when one of the AND gates 110 through 117 couples the digital pulses 45 to the control grid of the device 18. Consequently, the scanning spot 128 turns on during the scanlines selected by the AND gates 110—117 and produces light spots as determined by the digital pulses 45. Since the digital pulses 45 are substantially identical, the light spots are also substantially identical. The light spots are focused by the lens 36 onto photographic film 14 to produce the halftone image 15. The halftone dots in the image 15 are all of the same size, but vary in spatial density in both the X and Y coordinate directions. The image 15 is an accurate duplication of the pattern 13 on the transparency 12 and the film 15 is processed to produce final printing plates.

By selecting the scanlines in which the digital pulses 45 are to be applied to the imaging device 18, the halftone generator 10 determines the spatial frequency or density of the halftone dots in the Y coordinate direction. Such a selection prevents halftone dots from appearing below one another on successive scanlines in low spatial frequency areas, such as occurs in prior art systems. In such low frequency areas, few halftone dots occur and, if they appear one below the other, then visually disturbing vertical lines are created in the halftone image. In high spatial frequency areas, of course, a large number of halftone dots occur and such vertical wave patterns are not a problem.

Since the avoidance of the vertical wave patterns is important to trick the human eye into believing the halftone image is really a continuous tone image, the Y coordinate spacing of the halftone dots, i.e., scanline selection based on the tonal content of the original pattern 13, is quite important. In the table of FIG. 2, there are listed the scanlines selected by the system 10 for the various tonal values A through H corresponding to the outputs A through H in FIG. 1. It is to be noted that as the spatial frequency of the halftone dots increases, then the scanlines that are to be added are added in spaced relation to each other. This prevents adjacent scanlines in low spatial density areas from forming patterns that could be visually disturbing.

Although an electronic system 10 has been described, it is apparent that the same techniques may be utilized in a laser printing system wherein a printing plate is directly produced from the halftone dots provided by the laser beam. Thus, in accordance with the invention, a halftone image generator is provided that produces halftone dots of substantially the same size, but varies the spatial frequency of the halftone dots in both the X and Y coordinate directions to simulate an original pattern without creating visually disturbing line patterns therein.

I claim:

1. A system for producing a halftone image of a continuous tone scene comprising in combination;

first means for providing a plurality of halftone dots in a two coordinate direction pattern, with each of said halftone dots being of substantially the same predetermined size, second means for varying the spacings between said halftone dots in one of said coordinate directions of said pattern in accordance with the tones in said continuous tone scene and third means for canceling selected ones of said halftone dots in the other coordinate direction of said pattern in accordance with the tones in said continuous tone scene to produce an effective variation in spacings of said halftone dots in said other coordinate direction.

2. The combination in accordance with claim 1 wherein said first means includes an imaging device for producing radiation pulses representing halftone dots.

3. The combination in accordance with claim 2 wherein said second means includes a variable frequency multivibrator for producing substantially identical digital pulses having a repetition rate dependent on the densities of said tones in said continuous tone scene, and gating means for applying said digital pulses to said imaging device to produce said radiation pulses.

4. The combination in accordance with claim 3 wherein said radiation pulses are derived from a scanning beam produced by said imaging device, and said imaging device includes means for deflecting said scanning beam in said two coordinate direction pattern by a plurality of spaced scan lines.

5. The combination in accordance with claim 4 wherein said third means includes a tone measuring circuit coupled to measure the tones in said continuous tone scene to provide digitized outputs representing the various densities of said tones and means for coupling said digitized outputs to said gating means to control the application of said digital pulses to said imaging device.

6. The combination in accordance with claim 5 that further includes a counter for counting said scanlines of said imaging device.

7. The combination in accordance with claim 6 that further includes scanline select means coupled to said counter and said tonal measuring circuit to select one and more scanlines of said imaging device based on said digitized tonal values.

8. The combination in accordance with claim 7 wherein said digital output pulses are gated to said imaging device only on said selected scanlines to produce radiation pulses having a spatial frequency in one coordinate direction that is dependent on said variable frequency multivibrator and a spatial frequency in the other coordinate direction that is dependent on said tone measuring circuit.